United States Patent [19]

Mack et al.

[11] Patent Number: 6,147,167

[45] Date of Patent: Nov. 14, 2000

[54] PROCESS FOR PRODUCING POLYETHYLENE FILM COMPOSITION HAVING BROAD MOLECULAR WEIGHT DISTRIBUTION AND IMPROVED BUBBLE STABILITY

[75] Inventors: Mark P. Mack; James H. Meas, Jr., both of Houston; Paula L. Nygard, Lake Jackson, all of Tex.; Lawrence R. Wallace, North Kingstown, R.I.; Philip J. Garrison, Houston, Tex.

[73] Assignee: Equistar Chemicals, LP, Houston, Tex.

[21] Appl. No.: 09/337,460

[22] Filed: Jun. 21, 1999

Related U.S. Application Data

[62] Division of application No. 08/688,021, Jul. 26, 1996, Pat. No. 5,962,598.

[51] Int. Cl.[7] ............................. C08F 8/06; C08F 210/02
[52] U.S. Cl. .................... 525/333.8; 526/348.1; 526/348.2; 526/348.6; 264/211.12; 264/211.19; 525/333.7; 525/388
[58] Field of Search .................. 526/348.1, 348.2, 526/348.6; 264/211.12, 211.19; 525/333.8, 333.7, 388

[56] References Cited

U.S. PATENT DOCUMENTS

| | | |
|---|---|---|
| 4,405,404 | 9/1983 | Blom . |
| 4,508,878 | 4/1985 | Matsuo et al. . |
| 4,528,151 | 7/1985 | Matsuo et al. . |
| 4,578,431 | 3/1986 | Shaw et al. . |
| 4,614,764 | 9/1986 | Colombo et al. . |
| 4,963,622 | 10/1990 | Heitz . |
| 5,272,236 | 12/1993 | Lai et al. . |
| 5,284,613 | 2/1994 | Ali et al. .................... 264/566 |
| 5,728,335 | 3/1998 | Neubauer . |

OTHER PUBLICATIONS

Brochure: Alathon. Occidental Chemical Corporation, 1990.

*Primary Examiner*—David W. Wu
*Assistant Examiner*—Ling-Siu Choi
*Attorney, Agent, or Firm*—Alec H. Horn

[57] ABSTRACT

A process for producing a polyethylene film composition, comprising melt extruding a linear copolymer of ethylene and at least one other olefin having from 3 to 8 carbon atoms, said linear copolymer having a bimodal distribution comprising a high molecular weight fraction having a weight average molecular weight of at least 600,000 and a low molecular weight fraction having a weight average molecular weight of less than 20,000 at a temperature of from 195 to 285° C. in the presence of oxygen in an amount of from about 0.5 to about 6% by volume to improve bubble stability without any significant reduction in tear strength of film produced from said melt extruded linear copolymer.

2 Claims, No Drawings

PROCESS FOR PRODUCING POLYETHYLENE FILM COMPOSITION HAVING BROAD MOLECULAR WEIGHT DISTRIBUTION AND IMPROVED BUBBLE STABILITY

CROSS-REFERENCE TO RELATED APPLICATIONS

This application is a divisional of U.S. patent application Ser. No. 08/688,021, filed Jul. 26, 1996 now U.S. Pat. No. 5,962,598.

BACKGROUND OF THE INVENTION

1. Field of the Invention

The present invention relates to a process for producing a polyethylene film resin or composition. More particularly, the present invention relates to a polyethylene film composition made from a linear copolymer of ethylene and at least one other olefin and to such a composition that improves the bubble stability without any significant reduction in tear strength of film produced from the composition as compared with film produced from the linear copolymer.

2. Description of the Prior Art

High molecular weight, high density polyethylene (HMW HDPE) film resins for tough, thin film applications are generally extruded by a high stalk extrusion process that produces a biaxially oriented film. Economically, competitive high extrusion rates must be employed by the film manufacturer to minimize production costs. Small dies are used to attain the high blow-up ratios required to produce film of sufficient strength for the various thin-film applications. Since the performance requirements for producing tough thin film are very stringent, only HMW HDPE resins, which have broad, bimodal molecular weight distributions (MWDs) are viable in the marketplace. Resins or compositions that do not possess these characteristics do not extrude well at equally high rates because of bubble instability, among other factors, and also produce poorer film quality as compared to the leading polyethylene film compositions.

Workers in the field are constantly seeking to improve the processibility, e.g., the bubble stability, of the resins while maintaining necessary film properties such as Elmendorf tear and Total Energy Dart Drop (TEDD).

Preparation of linear high density copolymers, primarily containing ethylene, using, for example, highly active Ziegler-type catalysts, is well known and widely practiced in the industry. These catalysts, while increasing production rates of the resin, tend to produce polymers having a relatively narrow molecular weight distribution, resulting in processing problems during the high stalk extrusion process.

Desirably, one would combine highly active catalysts to achieve enhanced production rates of resin while at the same time producing a resin that would exhibit excellent bubble stability in high stalk extrusion. To a certain extent, these results have been achieved with what is commonly referred to as a broad bimodal MWD polyethylene, which contains a high molecular weight fraction having a weight average molecular weight of at least 600,000 and a low molecular weight fraction having a weight average molecular weight of less than 20,000. Such a composition generally has a broad enough MWD to be easily processed, so that excessive pressures and temperatures are not necessary, but not so broad that problems are encountered with poor physical properties in film produced from the resin. Nonetheless, there still remains a need for an improved film-grade polyethylene composition that, under high stalk extrusion conditions, exhibits excellent bubble stability without any appreciable loss of physical properties in film produced from the resin.

SUMMARY OF THE INVENTION

It is therefore an object of the present invention to provide an improved polyethylene composition that is readily processible in high stalk extrusion.

Another object of the present invention is to provide a polyethylene composition that exhibits excellent bubble stability in high stalk extrusion.

Still a further object of the present invention is to provide a process for treating a linear polyethylene copolymer of ethylene, and at least one other olefin having from 3 to 8 carbon atoms, to produce a polyethylene film composition having improved bubble stability without any significant reduction in tear strength of film produced from the composition as compared with film produced from the linear copolymer.

The above and other objects of the present invention will become apparent from the drawings, the description given herein, and the appended claims.

In one aspect, the present invention provides a polyethylene film resin, i.e., a composition for producing film products, characterized by a broad molecular weight distribution, preferably a broad bimodal molecular weight distribution, $M_W/M_n \geq 15$, a density of 0.920 to 0.970 g/cc, and a melt flow index (190° C./2.16 kg) of 0.01 to 0.2 g/10 min. The polyethylene film composition is produced by melt extruding a linear copolymer of ethylene and at least one other olefin having from 3 to 8 carbon atoms at a temperature of at least 200° C. in the presence of an effective amount of a free radical initiator sufficient to improve the bubble stability without any significant reduction in the tear strength of film produced from the composition as compared with film produced from the linear copolymer.

In another aspect of the present invention, there is provided a process for producing a polyethylene composition for producing film products by melt extruding a linear copolymer, as described above, having a broad, bimodal distribution comprising a high molecular weight fraction having weight-average molecular weight of at least 600,000 and a low molecular weight fraction having a weight-average molecular weight of less than 20,000 at a temperature of at least 180° C. in the presence of a free radical initiator in an amount sufficient to improve bubble stability without any significant reduction in tear strength of film produced from said composition as compared with film produced from said linear copolymer.

DESCRIPTION OF THE PREFERRED EMBODIMENTS

According to the process of the present invention, to produce a polyethylene film composition that can readily be processed into film products in a high stalk extrusion process without any loss of physical properties in the film, a linear copolymer (sometimes referred to as "linear polyethylene") is employed. The linear copolymer starting material can be produced by processes well known to those skilled in the art. For example, the linear copolymer starting material can be produced from a Ziegler-Natta catalyst in a slurry process using multi-stage polymerization. The linear copolymer starting material will contain from about 0.5 to about 4% by weight of a copolymerized, $C_3$–$C_8$ olefin and generally have a broad, bimodal profile comprising a mixture of high and low molecular weight components wherein the high molecular weight component is present in an amount of from about 10 to about 90% by weight, preferably from 40 to 60% by weight, most preferably from 45 to 55% by weight, and consists of a weight average molecular weight of at least 600,000, and the low molecular weight component is present in an amount of from about 90 to about 10% by weight, preferably from 60 to 40% by weight, most preferably from 55 to 45% by weight, and consists of a weight average molecular weight of less than 20,000. As will be apparent to those skilled in the art, the linear copolymer starting material will generally comprise a powder and have a density of at least 0.920 g/cc. A suitable, commercially available linear polyethylene starting material is known as Alathon® L5005 HDPE resin marketed by Lyondell Petrochemical Company. L5005 possesses the following typical properties:

| Property | Test Method | Units | Value |
|---|---|---|---|
| Density | ASTM D-1505 | g/cm$^3$ | 0.950[a] |
| Melt Flow Rate | ASTM D-1238 | g/10 min. | |
| MI | 190° C./2.16 kg | | 0.055 |
| High Load MI | 190° C./2.16 kg | | 8.5 |
| MWD | GPC | | Broad and Bimodal |

[a]Typical values, not intended to be used as specification.

According to the process of the present invention, during manufacture of a linear copolymer such as Alathon L5005 HDPE, the resin is melt extruded or pelletized in the presence of a free radical initiator under conditions that produce a polyethylene film composition that can be used to produce film products exhibiting excellent bubble stability without any resultant loss in physical properties such as MD and TD tear properties.

The free radical initiator can comprise oxygen, peroxides, or any other material that can initiate free radicals under the processing conditions without introducing any deleterious side reaction products into the polyethylene film composition produced. Non-limiting examples of such peroxides include 1,1-bis(t-butylperoxy)-3,3,5-trimethyl cyclohexane, 1,1-bis(t-butylperoxy)-cyclohexane, 2,2-bis(t-butylperoxy) octane, n-butyl-4,4-bis(t-butylperoxy)valerate, di-t-butylperoxide, t-butyl-cumylperoxide, dicumylperoxide, αα"-bis(t-butyl-peroxyisopropyl) benzene, 2,5-dimethyl-2,5-di(t-butylperoxy)hexane, 2,5-dimethyl-2,5-di(t-butylperoxy)hexyne-3, cumylperoxy neodecanoate, 2,5-dimethyl-2,5-di(benzoylperoxy)hexane, and t-butylperoxyisopropylcarbonate. These agents may be used alone or in combination as a mixture of two or more. Among these, a free-radical initiator having a decomposition temperature of about 200° C. with a half-life period of 1 minute is most preferable.

Typically, when the free radical initiator is a peroxide as described above, it will be incorporated into the linear polyethylene in a range of from about 20 to about 80 ppm of active peroxide. The peroxide free radical initiator can be incorporated into the linear polyethylene by means of a kneader such as a single screw extruder, a twin screw extruder, or a Banbury mixer, followed by pelletizing. Alternately, a powder master batch containing an excess of the peroxide free radical initiator is preliminarily produced, and this master batch is blended with linear polyethylene containing no peroxide initiator, followed by subjecting the mixture to a kneader, a twin screw extruder, etc.

Preferably, the free radical initiator will be oxygen in an amount of from about 0.5 to about 6% by volume, preferably from about 2 to about 6% by volume. It has been found that when the amount of oxygen exceeds about 6% by volume, the TEDD of the film ultimately produced is reduced, albeit that bubble stability is enhanced. When the free radical initiator used is oxygen, it can be conveniently introduced into the intensive mixer feed hopper.

The amount of free radical initiator, whether it be oxygen, a peroxide, or some other such initiator, will be sufficient to improve the bubble stability of the film composition without any significant reduction in the tear strength of film produced from the composition as compared with film produced from the linear polyethylene, which has not been subjected to the process of the present invention.

In conducting the process of the present invention, the linear copolymer is melt extruded or pelletized at a temperature of at least 180° C., the temperature range being generally from about at least 180° C. to about 285° C., depending on the nature of the free radical initiator. If the initiator is a peroxide, the temperature will generally range from 180 to 205° C., whereas if oxygen is employed, the temperature will generally range from at least 195 to 285° C.

Concomitantly with carrying out the melt extrusion or pelletizing in the presence of a free radical initiator, anti-oxidant concentrations in the composition are generally reduced.

The polyethylene film composition produced according to the process of the present invention is characterized by a broad, bimodal molecular weight distribution $MW/M_n \geq 15$; a density of 0.920 to 0.970 g/cc, preferably from about 0.940 to 0.970 g/cc; and a melt flow index (190° C./2.16 kg) of 0.01 to 0.2 g/10 min. The measure of the breadth of a molecular weight distribution is the ratio of the average molecular weight divided by the number average ($M_W/M_n$). These can be measured directly by gel permeation chromatography (GPC). Resin samples are dissolved in 1,2,4 trichlorobenzene (TCB) at nominal 0.11% weight/weight concentrations at 160° C. prior to analysis. The hot solutions were mixed before being placed into the injection chamber. The molecular weight determination is deduced by using narrow molecular weight polystyrene standards that are used to generate a universal calibration. The chromatographic separations were generated using TCB at 1.0 ml/min through three Polymer Labs 10 micron Mixed B column series with a refractive index and a Waters Solution Viscometer Detector housed in Water 150 GPCV at 145° C.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6 (621), 1968, incorporated herein by reference) to derive the equation:

$$M_{polyethylene} = (a)(M_{polystyrene})^b$$

In this equation, a=0.4316 and b=1.0. Weight average molecular weight, $M_W$, is calculated in the usual manner according to the formula:

$$M_W = (R)(w_i)(M_i)$$

where $w_i$ and $M_i$ are the weight fraction and molecular weight, respectively, of the ith fraction eluting from the GPC column.

The present invention is more fully illustrated by the following procedures and tests:

Preparation of Linear Polyethylene

The polyethylene was produced in a two-stage slurry process using a Ziegler catalyst involving a step of producing the high molecular weight polyethylene and a step of producing a low molecular weight polyethylene. Following the reaction, a powdered product was obtained having the following properties:

| Property | Target | Low | High |
|---|---|---|---|
| MI2, g/10 min. | 0.077 | 0.070 | 0.090 |
| Density, g/cc | 0.949 | 0.947 | 0.95 |

The linear polyethylene peroxide was blended with additives such as antioxidants and calcium stearate in a ribbon blender to produce a linear copolymer starting material having the following composition and properties:

| Property | Target | Low | High |
|---|---|---|---|
| MI2, g/10 min | 0.057 | 0.051 | 0.066 |
| MI20/MI2 | 155 | 140 | 180 |
| Density, cc | 0.949 | 0.947 | 0.951 |
| Calcium Stearate, ppm | 1500 | 950 | 2050 |
| Irganox ® 1010[a], ppm | 850 | 600 | 1300 |
| Irgafos ® 168[a], ppm | 600 | 400 | 800 |

[a]Antioxidants marketed by Ciba-Geigy Corporation.

The copolymer starting material was introduced into an intensive mixer feed hopper under a nitrogen atmosphere. To demonstrate the effect of adding a free radical initiator during melt extruding, various amounts of oxygen were introduced through an air injection system into the mixer feed hopper. The starting copolymer was then extruded and pelletized.

Testing of Linear Polyethylene Starting Material and Compositions Produced as per the Present Invention Five hundred lb. samples from the lots of linear polyethylene starting material produced as described above were collected and processed on an Alpine blown film extruder, Model No. HS65R-21D, to ascertain the effect of introducing a free radical initiator into the melt extrusion process vis-à-vis ascertaining changes in film properties produced from the polyethylene composition thus treated. All lots produced were audited on the Alpine film line, which was set up in the following configuration (160 mm die width, 1.5 mm die gap equipped with a 65 mm extruder producing 0.5 mil film at a constant 100 rpms). Samples were obtained from a control lot, from a control lot with reduced antioxidant content, and from a copolymer composition that had a reduced level of antioxidant but had been extruded in the presence of a free radical initiator while running at a neck height of 8 die diameters and a blow-up ratio of 4:1. These samples were submitted for normal physical property testing, including Elmendorf tear and TEDD. The processing parameters and the physical properties of the control lot, the control lot with reduced antioxidant, and the copolymer film composition prepared in accordance with the process of the present invention are shown in the table below:

| Product | Control | 1[a] | 2[b] |
|---|---|---|---|
| Neck Height, dd | 8 | 8 | 8 |
| Melt Pressure, psi | 7175 | 6700 | 6910 |
| Melt Temperature, ° F. | 403 | 398 | 402 |
| Output, lbs/hr | 240 | 237 | 243 |
| Bubble Stability | 34 | 33 | 41 |
| Neck-in | 3.895 | 3.844 | 3.805 |
| Gauge | | | |
| Average, mils | 0.49 | 0.49 | 0.49 |
| Range, mils | 0.35 | 0.35 | 0.21 |
| Standard Deviation | 0.09 | 0.09 | 0.09 |

-continued

| Product | Control | 1[a] | 2[b] |
|---|---|---|---|
| Elmendorf Tear, | | | |
| MD, gms | 13.8 | 13.9 | 13.0 |
| TD, gms | 32.9 | 32.7 | 29.4 |
| TD/MD | 2.4 | 2.4 | 2.3 |
| TEDD, ft. – lbs. | 2.17 | 2.12 | 2.05 |

[a]Same as control but with approximately 600 ppm less antioxidants in composition.
[b]Same as control but with approximately 200 ppm less antioxidants in composition and melt extruded in the pressure of 5.5% by volume oxygen.

As can be seen from the table above, the polyethylene composition produced according to the process of the present invention and identified as Product 2 showed markedly enhanced bubble stability while retaining desirable physical properties (see Elmendorf tear and TEDD results) as compared both with the control and with a product made with less antioxidant but no oxidation using a free radical initiator.

Polyethylene resins prepared by this invention are primarily used for the manufacture of biaxially oriented film in high stalk extrusion. A polyethylene melt is fed through a die gap (0.8 mm–1.5 mm) in an annular die that is attached to an extruder and produces a molten tube that is pushed vertically upward. At this point, the molten tube is approximately the same size as the annular die. Pressurized air is fed to the interior of the tube to maintain a constant air volume and to increase the tube diameter. The volume of air controls the size of the tube or the resulting blow-up ratio. In high stalk extrusion, the increase in the tube diameter occurs at a height of approximately 5–12 times the die diameter. This distance is referred to as the stalk or neck height. The increase of the tube diameter along with the film winder speed reduces the wall thickness of the resulting film, which ranges from 0.25–5.0 mil. The expanded tube also results in developing the biaxial orientation of the film. The tube is rapidly cooled by a cooling ring on the outside surface of the film attached to the die surface or from a cooling ring along with a cooling stalk for the inside surface of the film also attached to the die surface. Cooling and rate of cooling brings about crystallization of the polymer, which is important in maintaining the mechanical strength of the film. The web is collapsed between a pair of nip rollers and wound onto a film roll by the film winder. The collapsing of the tube is done after initial cooling at a point so that the wall surfaces will not adhere to one another. Mechanical strength of the film is defined in two directions, along the polymer flow exiting the die or machine direction (MD) and perpendicular to the polymer flow exiting the die or transverse direction (TD). The resins produced with this invention have a favorable balance of MD and TD tear strength.

Bubble Stability Rating

This test is designed to determine a numerical value describing a resin's vertical bubble stability in high stalk extrusion. The scale ranges from 1 to 52, with 52 being the highest rating, or the best bubble stability. The test is divided into two parts. The first part of the test is basically an indicator of melt strength. In this part of the test, a resin or a lot of material is processed at different neck heights. The test begins at a neck height of 10 die diameters and a blow-up ratio of 4:1. The bubble is lowered by one neck height until 6 die diameters is obtained, and numerical ratings are obtained at neck heights of 10, 9, 8, 7, and 6 die diameters. All extrusion conditions are kept constant during this part of the test. A numerical score is given to each neck height, depending upon the vertical movement of the bubble or the number of inches of deviation of the bubble. For example, if the bubble has less than 1" of vertical movement at 10 die diameters, then a numerical value of 5 is scored for the material and the test continues onto the lower neck height of 9 die diameters and then continues to the subsequent lower neck heights. A lower numerical value is given to the material as the vertical deviation increases. For example, at any given neck height, a 1" to 2" deviation would be assigned a value of 4; a 2" to 4" deviation, a score of 3; a greater than 4" deviation, a score of 2; and if the bubble breaks, the material is given a rating of 1, and the test is complete. If a material is able to be processed at all neck heights with minimal variation, it is assigned a numerical value of 25, and the second stage of testing has begun. However, a material can have a lower rating than 25 and still be tested in the second stage. For example, it is possible that a material will have been rated to have a 2" to 4" movement at any neck height, which would result in a lower rating than 25 but would allow the second part of the testing to be initiated.

The second part of test is basically a test of the elasticity or drawn down capability of the resin. At the 6 die diameter neck height, the film winder is increased in 25 fpm increments starting at 250 fpm to 400 fpm. At 400 fpm, the winder is increased in 50 fpm increments until 500 fpm is obtained. If less than 3" of movement is detected in the bubble, the material is assigned a numerical value of 3. If the bubble deviation is greater than 3", the material is assigned a numerical value of 2; and if the bubble breaks, then it is assigned a numerical value of 1, and the test has been completed. The film winder speed is increased until a bubble break is encountered or until 500 fpm winder speed is obtained. The sum of the numerical values assigned to both parts of the test is the "Bubble Stability Rating" for that particular material.

Using the bubble stability testing described above, film made from a control linear polyethylene was compared with film made from a polyethylene film composition made in accordance with the process of the present invention. The results conclusively showed that there was a significant increase in bubble stability ratings for the polyethylene film composition produced according to the present invention. The average rating obtained on representative control, linear polyethylene lots was 34.8, whereas the average rating on lots produced according to the process of the present invention was 45.4.

Samples of linear polyethylenes were treated in accordance with the process of the present invention at various oxygen levels to determine the effect of oxygen content on bubble stability and physical properties of film produced from the polyethylene film composition. Between a level of about 2 to about 6% by volume of oxygen, the resulting film produced shows enhanced bubble stability as compared with film produced from linear polyethylene that has not been treated in accordance with the process of the present invention. At the same time, TEDD values remain acceptable. If, however, the level of oxygen is increased, i.e., in the range of from about 6 to about 10% by volume, TEDD drops to an unacceptable level, albeit that bubble stability increases. The result are shown below:

| Sample | Control | A[1] | B[1] | C[1] |
|---|---|---|---|---|
| $O_2$ Amount Vol. % | 0 | 2 | 5 | 10 |
| Bubble Stability Rating | 1 | 1.02 | 1.18 | 1.36 |
| Elmendorf Tear | | | | |
| MD Tear | 1 | 1.02 | 1.13 | 1.25 |
| TD Tear | 1 | 0.88 | 0.85 | 0.75 |
| Dart Strength | 1 | 0.95 | 0.92 | 0.75 |

[1]Data were normalized to control sample.

Accordingly, whereas an oxygen content of from about 0.5 to about 6% by volume gives enhanced bubble stability without adversely affecting other film properties such as tear and dart (TEDD), it is preferred that the amount of oxygen be in the range of from about 2 to about 6% by volume.

Demonstration of Use of Peroxides in Increasing Bubble Stability

Samples of a linear copolymer containing 0, 20, and 60 ppm of 2,5 dimethyl-2,5 di-tert-butyl peroxy hexane were melt extruded to determine the effect of using peroxides in enhancing bubble stability. In this case, bubble stability was visually determined. The results are shown in the table below:

| Sample | A | B | C |
|---|---|---|---|
| Peroxide Level (ppm) (as peroxide) | 0 | 20 | 60 |
| Bubble | | | |
| Stability | Poor | Fair | Fair |
| Side/Side | Poor/Fair | Fair | Fair |
| Up/Down | | | |
| $Mi_2$ (g/10 min.) | 0.045 | 0.040 | 0.030 |
| $Mi_{20}/Mi_2$ Ratio | 149 | 159 | 201 |
| Elmendorf Tear | | | |
| MD, gms | 17 | 21 | 37 |
| TD, gms | 393 | 274 | 127 |
| TD/MD | 23 | 13 | 35 |
| Dart Impact | 277 | 399 | 429 |

As can be seen from the table above, the use of peroxide as a free radical initiator leads to somewhat improved bubble stability as visually determined.

The foregoing description and examples illustrate selected embodiments of the present invention. In light thereof, variations and modifications will be suggested to one skilled in the art, all of which are in the spirit and purview of this invention.

What is claimed is:

1. A process for producing a polyethylene film composition, comprising melt extruding a linear copolymer of ethylene and at least one other olefin having from 3 to 8 carbon atoms, said linear copolymer having a bimodal distribution comprising a high molecular weight fraction having a weight average molecular weight of at least 600,000 and a low molecular weight fraction having a weight average molecular weight of less than 20,000 at a temperature of from 195 to 285° C. in the presence of oxygen in an amount of from about 0.5 to about 6% by volume to improve bubble stability without any significant reduction in tear strength of film produced from said melt extruded linear copolymer.

2. The process of claim 1, wherein said linear copolymer is produced by a slurry process employing multistage polymerization.

* * * * *